United States Patent [19]
Smith

[11] Patent Number: 5,987,543
[45] Date of Patent: Nov. 16, 1999

[54] METHOD FOR COMMUNICATING DIGITAL INFORMATION USING LVDS AND SYNCHRONOUS CLOCK SIGNALS

[75] Inventor: Ronald L. Smith, Dallas, Tex.

[73] Assignee: Texas Instruments Incorporated, Dallas, Tex.

[21] Appl. No.: 08/921,303

[22] Filed: Aug. 29, 1997

[51] Int. Cl.$^6$ .................................................. G06F 13/38
[52] U.S. Cl. ........................ 710/70; 395/500; 370/286; 348/469
[58] Field of Search ................................. 395/885, 880, 395/501, 500; 345/507; 370/286; 327/218; 348/469; 710/70, 60

[56] References Cited

U.S. PATENT DOCUMENTS

| | | | |
|---|---|---|---|
| 5,148,426 | 9/1992 | Shenoi | 370/286 |
| 5,406,199 | 4/1995 | Shah | 324/158.1 |
| 5,559,954 | 9/1996 | Sakoda | 245/507 |
| 5,784,633 | 7/1998 | Petty | 395/880 |
| 5,793,236 | 8/1998 | Kosco | 327/218 |
| 5,859,669 | 1/1999 | Prentice | 348/469 |

*Primary Examiner*—Thomas C. Lee
*Assistant Examiner*—Harold Kim
*Attorney, Agent, or Firm*—Ronald O. Neerings; Richard L. Donaldson

[57] ABSTRACT

Video data is communicated in a computer system using LVDS signaling. To maintain minimum setup time requirements, video data is translated to LVDS data streams using a TTL-to-LVDS converter (84) which clocks data at the rising edge of a pixel clock signal and is re-converted using an LVDS-to-TTL converter (86) which uses the falling edge of the pixel clock to clock data for output.

21 Claims, 6 Drawing Sheets

5,987,543

METHOD FOR COMMUNICATING DIGITAL INFORMATION USING LVDS AND SYNCHRONOUS CLOCK SIGNALS

BACKGROUND OF THE INVENTION

1. Technical Field

This invention relates in general to computers and, more particularly, to transmission of video signals in a computer.

2. Description of the Related Art

In the design of electronic devices, the transmission of electrical signals presents significant problems. A major concern is the electromagnetic interference (EMI) generated by each line carrying TTL (transistor to transistor logic) logic levels. The FCC (Federal Communications Commission) has provided strict guidelines on the allowable EMI emissions from an electronic device. In order to comply with FCC regulations, there have been many improvements made to the component housing designs which reduce EMI emissions.

However, as the internal circuitry of electronics become more complex, the number of lines increases along with the speed of data transmission on those lines. Both factors increase the EMI emitted by the internal circuitry. At some point, improvements to the housing design alone are not enough to comply with the FCC regulations.

Accordingly, manufacturers have used other techniques to reduce EMI emissions. One technique used in the portable computer field involves connecting the output of the video/graphics controller to an LCD (liquid crystal display) using LVDS (low voltage differential signaling). Differential signaling represents logic levels as the polarity between a pair of lines. For example, to represent a logical "1", the first line of the pair has a voltage of +0.345 volts, while the second line of the pair has a voltage of −0.345. To represent a logical "0", the first line of the pair has a voltage of −0.345 volts, while the second line of the pair has a voltage of +0.345. Because the logical levels are represented at low voltages, and at offsetting voltages, EMI is greatly reduced. This allows data from multiple lines to be multiplexed into fewer, higher speed, lines while still maintaining low EMI emissions.

Using LVDS transmission in other parts of the system has proven problematic. Because off-the-shelf LVDS/TTL converters affect the skew between the pixel clock and the signals, conversion of TTL/CMOS signals to LVDS with a subsequent conversion from LVDS signals to TTL/CMOS can result in setup and hold problems. The cost of designing custom LVDS/TTL converters for specific applications is generally prohibitive.

Therefore, a need has arisen for translating between LVDS and TTL/CMOS signals using off-the-shelf converters.

SUMMARY OF THE INVENTION

The present invention provides circuitry for transmitting digital information stream at predetermined logic levels over a LVDS data stream, which can use off-the-shelf LVDS conversion circuits. An LVDS transmitter receives a synchronous clock signal and the digital information stream and converts the digital information stream to an LVDS data stream responsive to a first edge of the clock signal. An LVDS receiver is coupled to said LVDS transmitter for converting said LVDS data stream to the predetermined logic levels, by clocking the received digital information stream at a second edge of the clock signal.

The present invention provides significant advantages over the prior art. By clocking the data at the transmission end of the LVDS stream at a first edge (i.e., the rising edge) of the clock signal and by clock data at the receiving end of the LVDS stream at a second edge (i.e., the falling edge) of the clock signal, the original setup time requirement is preserved, without the need for custom LVDS converters.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE PREFERRED EMBODIMENT

The present invention is best understood in relation to FIGS. 1–10b the drawings, like numerals being used for like elements of the various drawings.

Figure 1:
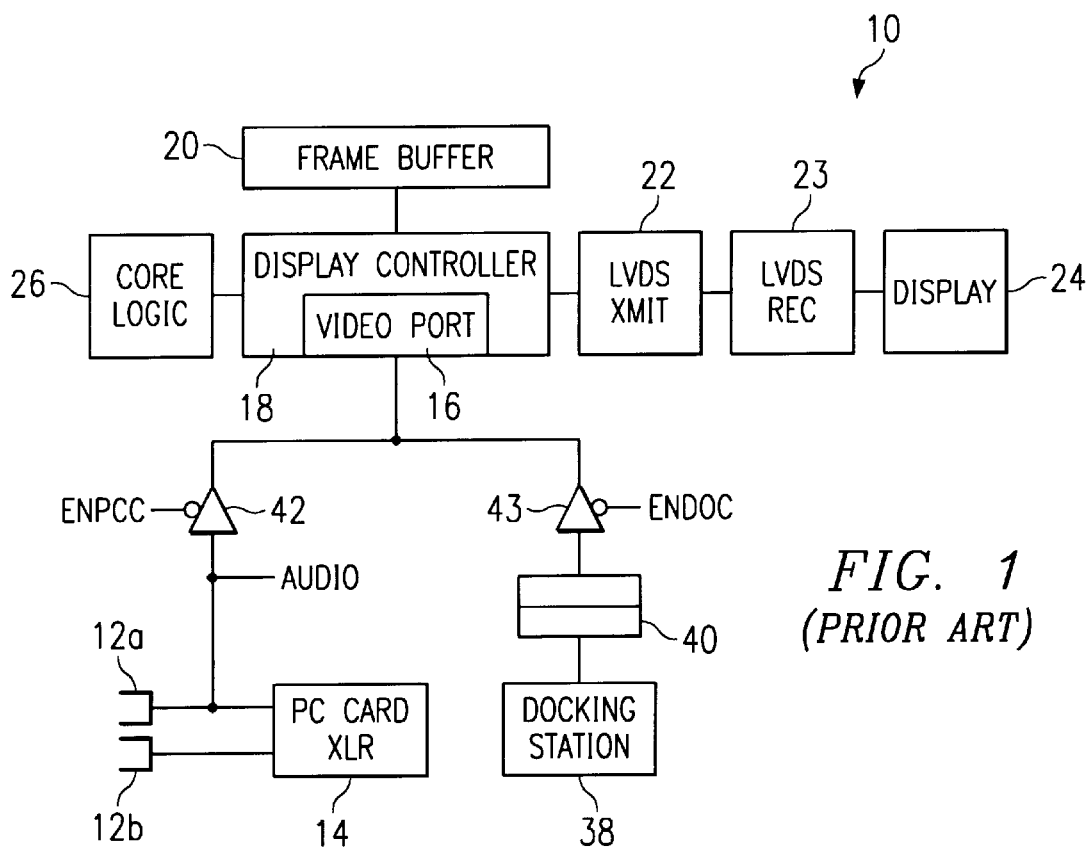
FIG. 1 illustrates a block diagram of a prior art computer system.

FIG. 1 illustrates a block diagram of a prior art portable computer design. In the embodiment shown in FIG. 1, the computer 10 has two peripheral slots (such as PC Card slots) 12a–b, one of which (slot 12a) is able to receive Zoomed video, described in greater detail hereinbelow. The peripheral slots 12a–b are coupled to a controller 14. Slot 12a is coupled to the video port 16 of a display controller 18. Display controller 18 is coupled to a frame buffer 20 and an LVDS transmitter 22. LVDS transmitter 22 is coupled to an LVDS receiver 23, which is coupled to a display 24. Core logic 26 represents processing circuitry including the CPU, memory, BIOS (basic input output system) and I/O control. A docking station 38 can be coupled to the video port 16 through a connector 40. Buffer 42 enables slot 12a to access the video port 16 and buffer 43 enables the docking station to access video port 16.

The LVDS connection to the display 24 is a relatively new concept. Because of the large number of lines needed to address higher resolution displays, LVDS has been used to reduce the number of lines and the resultant EMI associated with the connection to the display. One embodiment of a computer using a LVDS display is U.S. patent application Ser. No. 08/664,089, filed Jun. 14, 1996, entitled "Portable Computer With Low Voltage Differential Signaling Adapter" to Boesch et al, which is incorporated by reference herein.

PC Card slots allow a user to add functionality to a computer by placing a credit-card sized circuit into one of the slots 12a or 12b. While used mainly in notebook computers, PC Card slots can work in any computer system. Typical uses for the PC Card slots are to add a modem or a external hard drive to the system. More recently, cards providing Zoomed video have been introduced.

The widening use of multimedia in notebook computer systems has put increasing demands on notebook video systems. Some video features such as decoding and playback of MPEG1 video (which is a video compression protocol specified by Motion Pictures Experts Group) can require the full processing power of a 120 megahertz PENTIUM (by Intel Corporation) processor. This is undesirable in a notebook platform since a PENTIUM processor running at full speed for an extended amount of time generates a large amount of heat and dissipates a large amount of power. Also, if a processor's bandwidth is completely used for decoding video, the system is unable to process any other tasks, thereby eliminating, or greatly reducing the efficiency of, multitasking. Accordingly, devices which process the video have been developed to relieve the CPU of such duties.

Supporting 24-bit color at thirty frames per second at a resolution of 1024×768 requires a data bandwidth of around 70 megabytes per second. This type of bandwidth requirement uses up almost all of the theoretical bandwidth of the PCI (Peripheral Connect Interface) bus found in most computers today. Once all bandwidth in a system is used to fetch and display data, there is no bandwidth left to transfer video data between special video processing chips. Zoomed video was incorporated into the PC card specification to alleviate the processing overload presented by multimedia.

Zoomed video cards are designed to fit into standard PC card slots. Systems that support Zoomed cards have an 8- or 16-bit video port 16. The video port 16 allows a device to pass video data directly to the video frame buffer 20 via the graphics controller 18, rather then tying up the bus, typically a PCI bus. With Zoomed video, a PC Card device can connect to the video feature bus to bypass the PCI bus. The video port on the graphics controller is enabled only when the graphics controller is in video feature port mode.

When connected to the docking station 38, a laptop computer can access additional circuits in a form factor associated with a desktop computer. Typical circuits which might be in a docking station 38 are a network interface card, a large hard drive, and enhanced video/graphics card(s). As with a Zoomed video PC card, a video card, such as an MPEG decoder, should be coupled to the video port 16 of the laptop's graphic controller.

Figure 2:
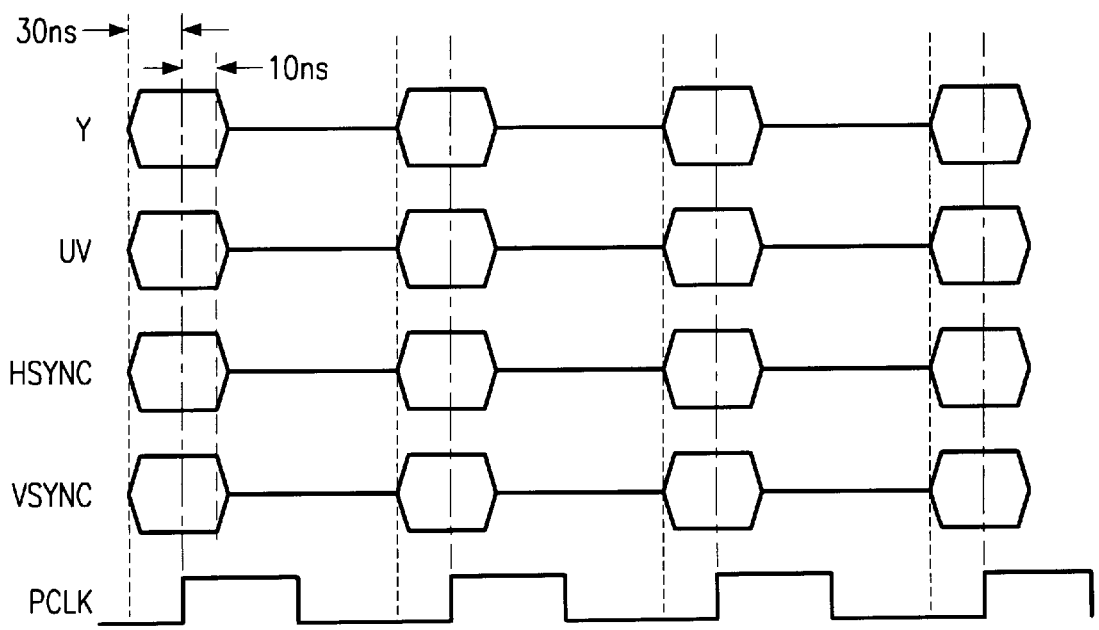
FIG. 2 illustrates clock signal specifications for video signals at the video port of FIG. 1.

FIG. 2 illustrates video signals received by the video port 16. The four video signals are Y, UV, Hsync, and Vsync. Each signal is clock by a pixel clock (PCLK).

Zoomed video standards specify that each of the Y, UV, HSYNC and VSYNC signals have 30 nanosecond (ns) setup and 10 ns hold time (although typical signals may hold longer). Therefore, the video port 16 expects that the Y, UV, HSYNC and VSYNC signals will begin a transition at least 30 ns prior to the leading edge of PCLK and will hold their logical values at least 10 ns subsequent to the leading edge of PCLK. In order for error free operation, it is important that the setup and hold times be met by the device providing video to the video port 16.

Figure 3:
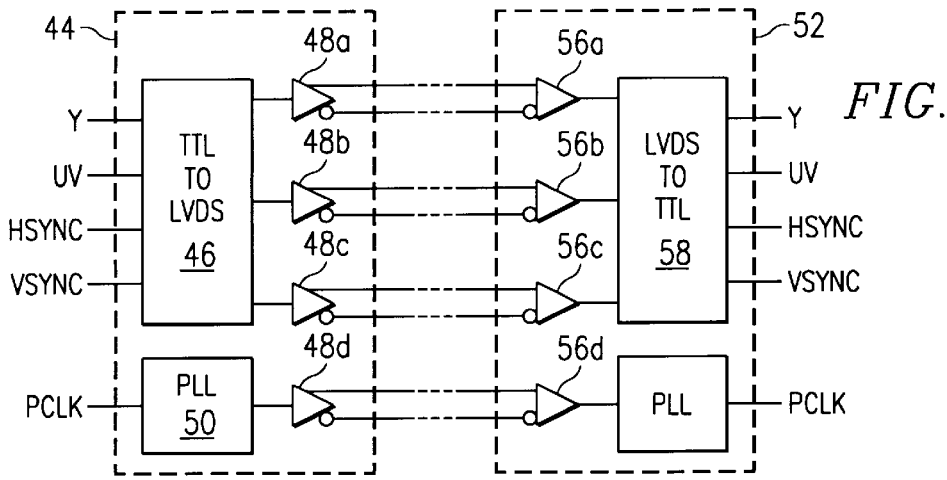
FIG. 3 illustrates a circuit for communication signals using LVDS signaling.

FIG. 3 illustrates a circuit for receiving the Y, UV, HSYNC and VSYNC video signals at TTL logic levels, converting the video signals and PCLK to LVDS signals, and converting the LVDS video signals back to TTL logic levels. A TTL-LVDS converter 44 receives the Y, UV, HSYNC and VSYNC signals in a TTL Parallel-to-LVDS converter 46. A typical off-the-shelf TTL-to-LVDS converter can convert 21 bits of CMOS/TTL data into three LVDS data streams, shown at outputs 48a–48c. PCLK is transmitted in parallel with the LVDS video data streams over a fourth LVDS data stream using a phase-locked loop (PLL) 50, which increases the frequency of PCLK by a factor of 7 (21 bits per clock/3 data streams) and transmitted through output 48d.

The four LVDS data and clock streams are received by a LVDS-to -TTL converter 52, after traveling over lines 54. Inputs 56a–c receive the LVDS data streams from the respective outputs 48a–d. LVDS-to-parallel TTL circuit 58 converts the signals from inputs 56a–c. PLL 60 converts the LVDS clock signal from input 56d and reduces the frequency of the clock signal by a factor of seven to restore PCLK.

Figure 4A:
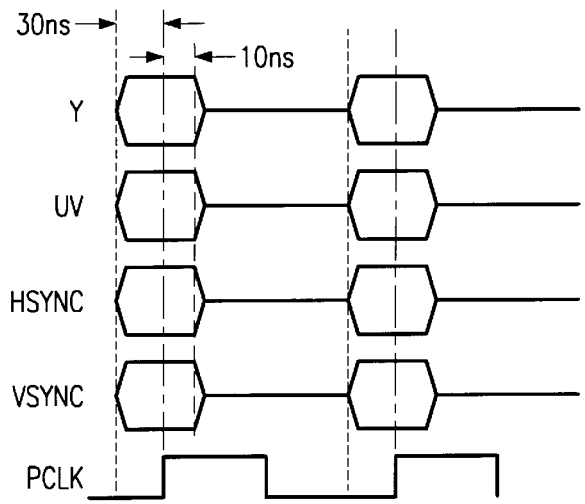
FIGS. 4a and 4b illustrate clock signals at the transmitting and receiving ends of the circuit of FIG. 3.
Figure 4B:
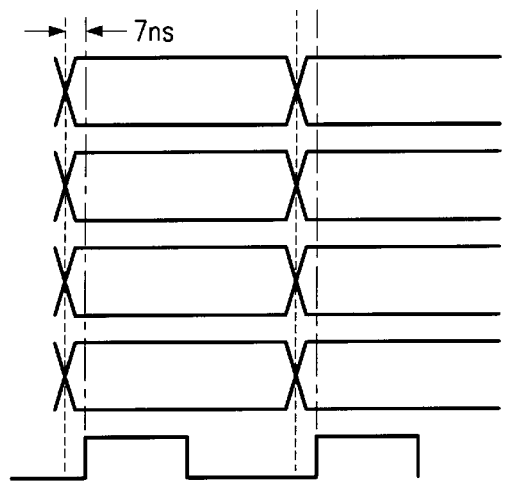

FIGS. 4a–b illustrate the signals at the input to TTL-to-LVDS converter 44 and at the output of the LVDS-to-TTL converter 52, respectively. While the frequency of the video data and clock signals are identical from input.to output, the setup time of at the output has been reduced to 7 ns by the LVDS-to-TTL converter 52, i.e., the rising edge of PCLK occurs 7 ns after the rising edges of the video information signals. Accordingly, a video controller designed to the Zoomed video specification may encounter errors due to insufficient setup times.

Figure 5:
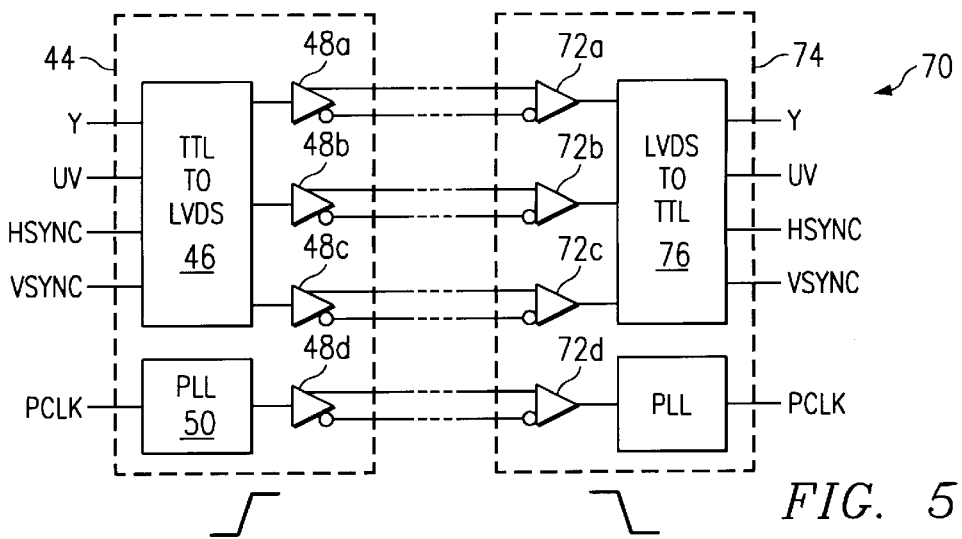
FIG. 5 illustrates a circuit for communicating signals using LVDS signaling while maintaining minimum setup time requirements.

FIG. 5 illustrates a TTL-to-LVDS-to-TTL circuit 70 which uses off-the-shelf converters, but provides a much longer setup time. As in FIG. 3, the Y, UV, HSYNC and VSYNC signals are input to a TTL-to-LVDS converter 44 including a TTL Parallel-to-LVDS converter 46, PLL 50 and outputs 48a–d. The outputs 48a–d are coupled to respective inputs 72a–d of a falling-edge triggered LVDS-to-TTL converter 74. Inputs 72a–c pass the data signals to a LVDS-toParallel TTL converter 76 and input 72d passes the PCLK signal to PLL 78.

In operation, the circuit of FIG. 5 converts the input TTL data signals to three streams of high speed LVDS signals at converter 44 and restores the data signals to TTL outputs at converter 74. Unlike the circuit of FIG. 3, however, the signals are restored to the falling edge of PCLK. Hence, the falling edge of the PCLK signal occurs approximately 7 ns after the transition of the data signals Y, UV, HSYNC and VSYNC.

Figure 6A:
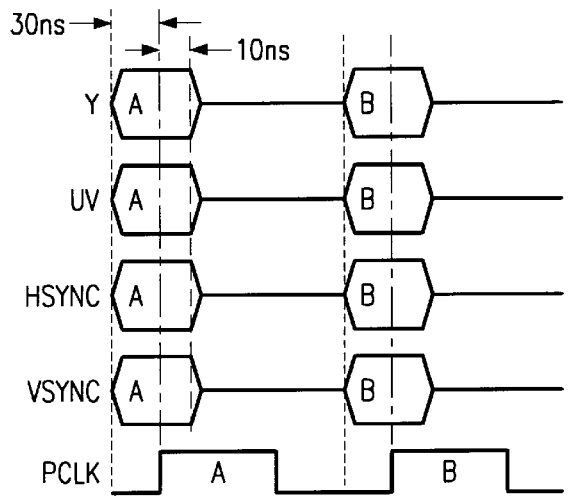
FIGS. 6a and 6b illustrate clock signals at the transmitting and receiving ends of the circuit of FIG. 5.
Figure 6B:
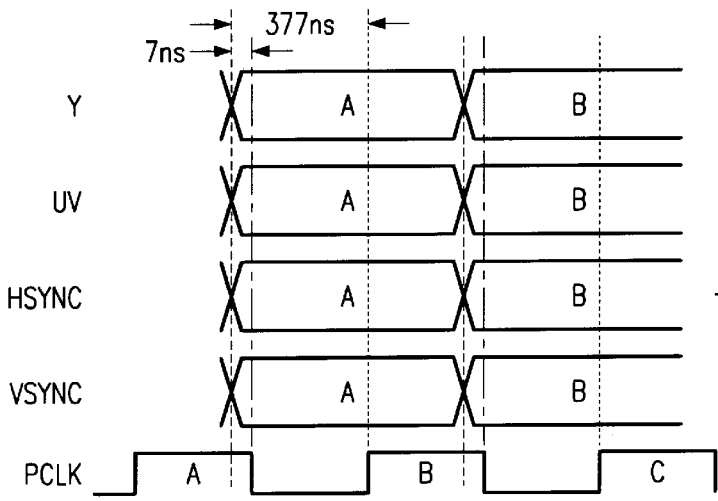

The signals are shown graphically in FIGS. 6a–b. The signals input to TTL-to-LVDS converter 44 are the same as shown in FIG. 4a, with a thirty nanosecond (or more) setup time between the data signals and the PCLK signal. The data signals at the output, however, lead the falling edge of the restored PCLK signal by approximately 7 ns. Assuming a PCLK at 13.5 MHz and at 50% duty cycle, the period of PCLK is approximately 740 ns. Consequently, the next rising edge of the PCLK signal is displaced by approximately 377 ns (740/2+7) from the leading edge of the data signals, well in excess of the 30 ns setup requirement.

By using a falling edge clock on the LVDS-to-TTL converter 72, the rising edge of PCLK will effectively be displaced by approximately one-half of a clock. The fact that the particular rising edge was associated with a subsequent transition at the input of converter 44 (i.e., the rising edge at clock B is associated with the data signal B at the input, as shown in FIG. 6a, and is associated with the data signal A at the output, as shown in FIG. 6b) will not affect operation of the video port 16, which clocks in data at each rising edge of PCLK.

Accordingly, the circuit of FIG. 5 provides a setup time of approximately 377 ns (for a 13.5 MHz PCLK) at the output, which is more than enough for the specific embodiment described herein, namely Zoomed Video. Other applications could similarly benefit from the configuration shown herein. One such application in the notebook computer field would be to transfer the audio signals (4 lines) at LVDS along with the Zoomed Video. While the audio signals are at 44.1 kHz (sometimes referred to as an $I^2S$ signal), sampling at 13.5 MHz, albeit asynchronous to the audio bitstream, will produce a faithful representation due to the high oversampling rate.

Figure 7:
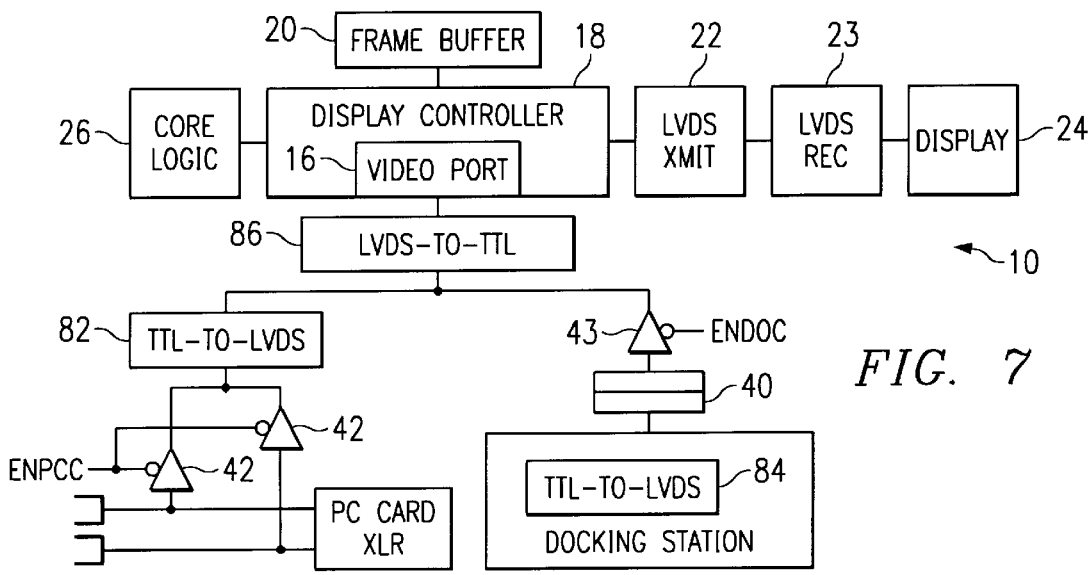
FIG. 7 illustrates a computer system using the circuit of FIG. 5.

FIG. 7 illustrate a block diagram of the video/graphics portion of notebook computer 80 using the circuit of FIG. 5. For purposes of illustration FIG. 7 does not show details of the core logic 26, such as the processing circuits, main memory, BIOS, input/output circuits, or mass storage. FIG. 7 differs from the prior art circuit of FIG. 1 in that video and audio signals from the PC Card slots 12a and 12b are coupled to a rising edge triggered TTL-to-LVDS converter 82 and the video and audio signals from the docking station 38 are coupled to a rising edge triggered TTL-to-LVDS converter 84. The outputs of the TTL-to-LVDS converters 82 and 84 are coupled to the video port 16 via a falling edge triggered LVDS-to-TTL converter 86.

In operation, the video signals from the PC Cards 12a and 12b and from the docking station 16 can be sent to the video port at low EMI levels, while maintaining the specified setup time.

Figure 8A:
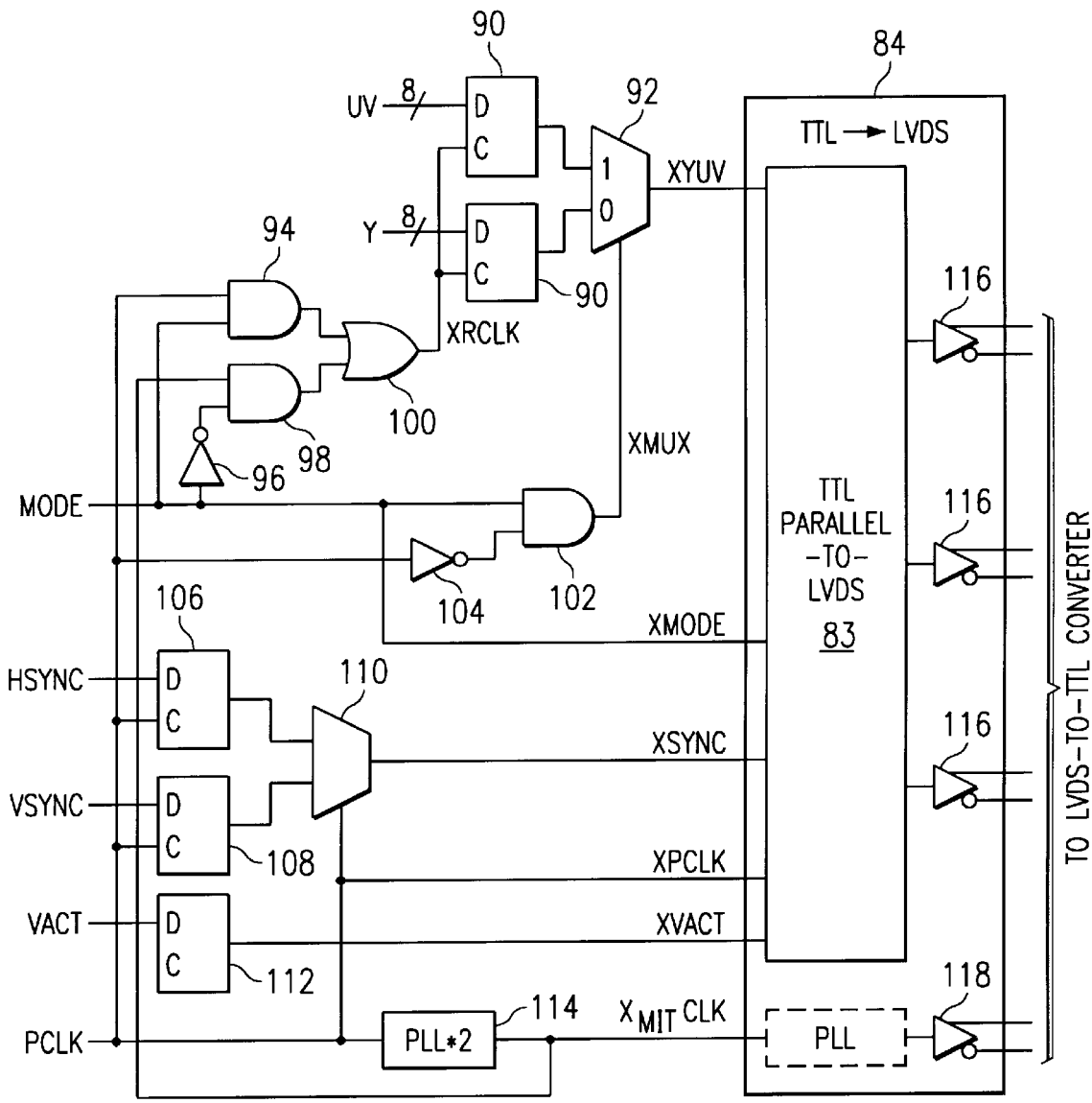
FIGS. 8a and 8b illustrate a circuit for communicating video data in multiple formats using LVDS signaling.
Figure 8B:
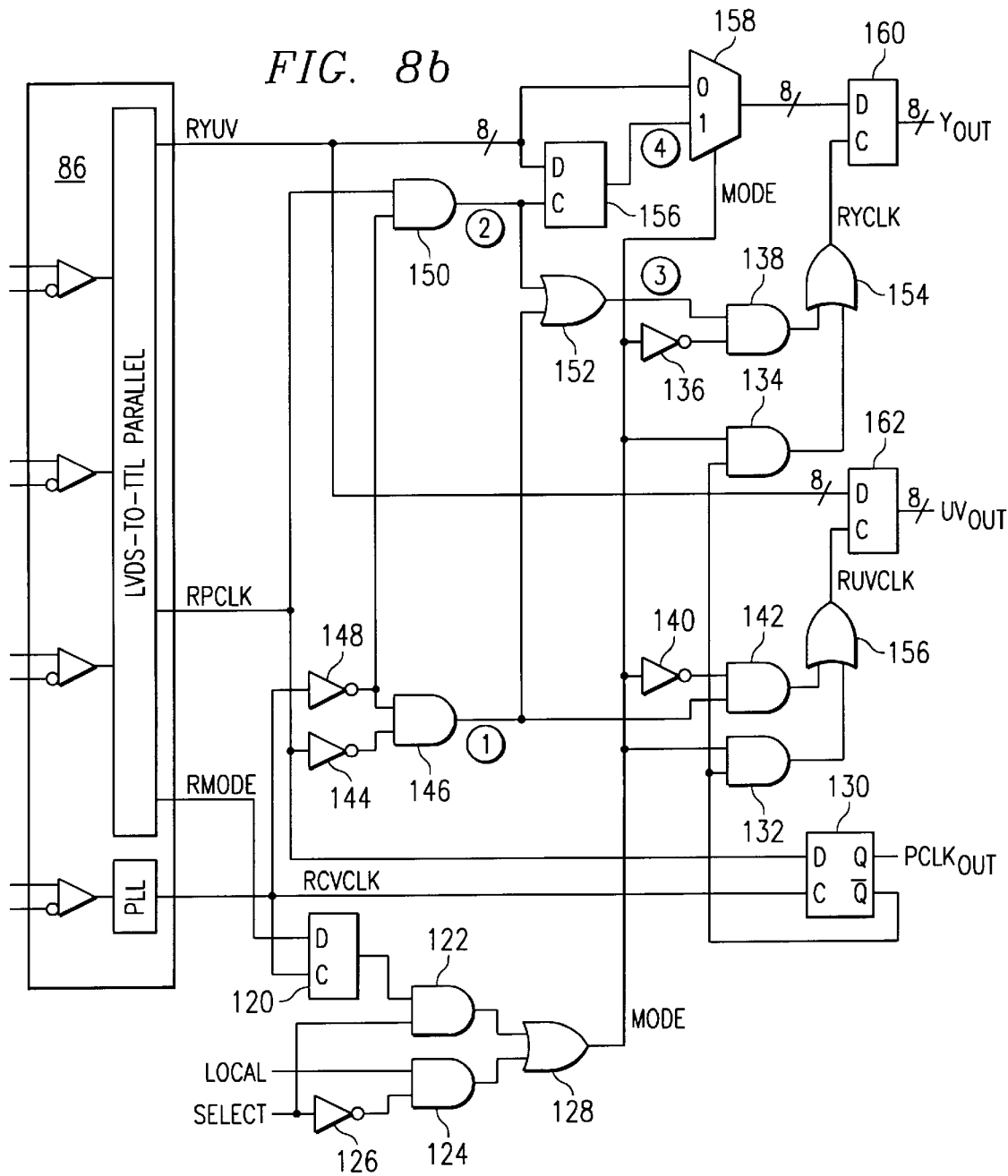
Figure 9:
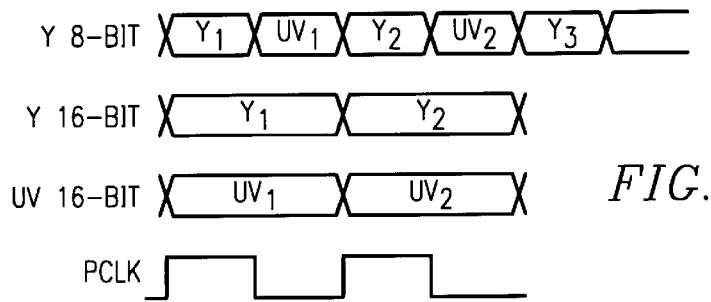
FIG. 9 illustrates clock signal for video data in 8-bit and 16-bit formats.

FIGS. 8a and 8b illustrate a preferred embodiment of the connections between the TTL-to-LVDS converter 82 and 84 and the LVDS-to-TTL converter 86. This embodiment allows video data to be in 8-bit form or 16-bit form, as shown in FIG. 9. In 8-bit form, the Y and UV signals are sent in a single 8-bit stream, with the Y data available on the rising edge of PCLK and the UV data available on the falling edge of PCLK.

Referring again to FIGS. 8a the TTL-to-LVDS converter circuitry is shown. The UV and Y signals (each being eight bits wide) are each coupled to a respective flip-flop 90 (also eight bits wide). The outputs of flip-flops 90 are coupled to first and second inputs of a two input multiplexer 92. The output of multiplexer 92 is coupled to data inputs of the TTL-to-LVDS converter 84. A MODE control signal indicates whether the Y and UV data is in 8-bit (MODE=0) or 16-bit (MODE=1) form. The MODE signal is coupled to AND gate 94 and to inverter 96. The output of inverter 96 is coupled to a first input of AND gate 98. The outputs of AND gates 94 and 98 are coupled to the inputs of OR gate 100. The output of OR gate 100 is connected to the clock inputs of flip-flops 90.

The MODE control signal is further connected to a first input of AND gate 102. PCLK is connected to the second input of AND gate 102 through inverter 104. The output of AND gate 102 is connected to the control input of multiplexer 92.

HSYNC and VSYNC are coupled to flip-flops 106 and 108, respectively. The output of multiplexers 106 and 108 are coupled to multiplexer 110. PCLK is coupled to the control input of multiplexer 110. The output of multiplexer 110 is coupled to the data pins of TTL-to-LVDS converter 84.

VACT is coupled to flip-flop 112. The output of flip-flop 102 is coupled to a data pin of TTL-to-LVDS converter 84. PCLK is coupled to a phase locked loop clock doubler 114. The output of clock doubler 114 is coupled to the clock input of TTL-to-LVDS converter 84 and to the second input of AND gate 98.

TTL-to-LVDS converter 83 provides a plurality of differential data signals 116 and a differential clock signal 118.

In operation, if MODE=0 (i.e., the device is in 8-bit mode), then AND gate 94 outputs a logical "0" and AND gate 98 passes the doubled PCLK signal (hereinafter "XmitCLK"). The output of AND gate 102 (XMUX) is set to a logical "0". Consequently, multiplexer 92 passes the Y signal, which in 8-bit mode contains both the Y and UV data.

Alternatively, if MODE=1, AND gate 98 is set to output a logical "0" and AND gate 94 passes the PCLK signal. The output of AND gate 102 is an inverted PCLK signal. Thus, PCLK latches the Y and UV on its rising edge; multiplexer 92 outputs Y when PCLK is high (and XMUX is thus low) and UV when PCLK is low (and XMUX is thus high). Consequently, the data output of multiplexer 92 (XYUV) is the same as that shown in FIG. 9a.

The differential outputs of TTL-to-LVDS converter 84 are coupled to differential inputs of LVDS-to-TTL converter 86. FIG. 8b illustrates circuitry coupled to LVDS-to-TTL converter 86 to place the video signals Y and UV in form for the video port 16. For illustration purposes, signals which enter the TTL-to-LVDS converter 84 are preceded by an "X", while corresponding signals output from the LVDS-to-TTL converter 86 are preceded by an "R". Hence, the output of multiplexer 92 is the XYUV signal at the input of TTL-to-LVDS converter 84 and the corresponding signal is output from the LVDS-to-TTL converter 86 as RYUV.

RMODE is input to flip-flop 120, which is clocked by RcvCLK. RcvCLK is the recovered clock signal. The output of flip-flop 120 is input to AND gate 122 along with a SELECT control signal. A LOCAL control signal is input to AND gate 124. The second input of AND gate 124 is coupled to the SELECT signal after inversion by inverter 126. The outputs of AND gates 122 and 124 are coupled to the inputs of OR gate 128. The output of OR gate 128 is referred to as the MODE signal.

RPCLK is coupled to the input of flip-flop 130, which is clocked by the RcvCLK. The output of flip-flop 130 is the PCLKout signal. The inverted output of flip-flop 130 is coupled to inputs of AND gate 132 and AND gate 134. The MODE signal is coupled to the other inputs of AND gates 132 and 134. The mode signal is also input to inverter 136, whose output is coupled to an input of AND gate 138, and to inverter 140, whose output is coupled an input of AND gate 142.

RPCLK is coupled to inverter 144. The output of inverter 144 is coupled to and gate 146. RcvCLK is coupled to inverter 148. The output of inverter 148 is coupled the other input of AND gate 146 and to an input of AND gate 150. an input of AND gate 144. The other input of AND gate 150 is coupled to RPCLK.

The outputs of AND gates 144 and 150 are coupled to the inputs of OR gate 152. The output of OR gate 152 is coupled to an input of AND gate 138. The output of AND gate 146 is also coupled to an input of AND gate 142. The outputs or AND gates 138 and 134 are couple to the inputs of OR gate 154. The outputs of AND gates 142 and 132 are coupled to the inputs of OR gate 156.

RYUV is coupled to the input of flip-flop 156 (eight bits wide), which is clocked by the output of AND gate 150. The RYUV signal is coupled to the "0" input of multiplexer 158. The output of flip-flop 156 is coupled to the "1" input of multiplexer 158. The control input of multiplexer 158 is coupled to the MODE signal.

The output of multiplexer 158 is coupled to flip-flop 160, which is clocked by the output of OR gate 154 (RYCLK).

The output of flip-flop 160 is the Yout signal.

RYUV is also coupled to the input of flip-flop 162, which is clocked by the output of OR gate 156 (RUVCLK). The output of flip-flop is the UVout signal.

In operation, the signal can be formatted in either 8-bit or 16-bit mode responsive to either the MODE signal which is passed from the TTL-to-LVDS converter 84 to the LVDS-to-TTL converter 86, or locally in response to the LOCAL signal. If SELECT=1 then MODE=RMODE. If SELECT=0, then MODE=LOCAL.

Figure 10A:
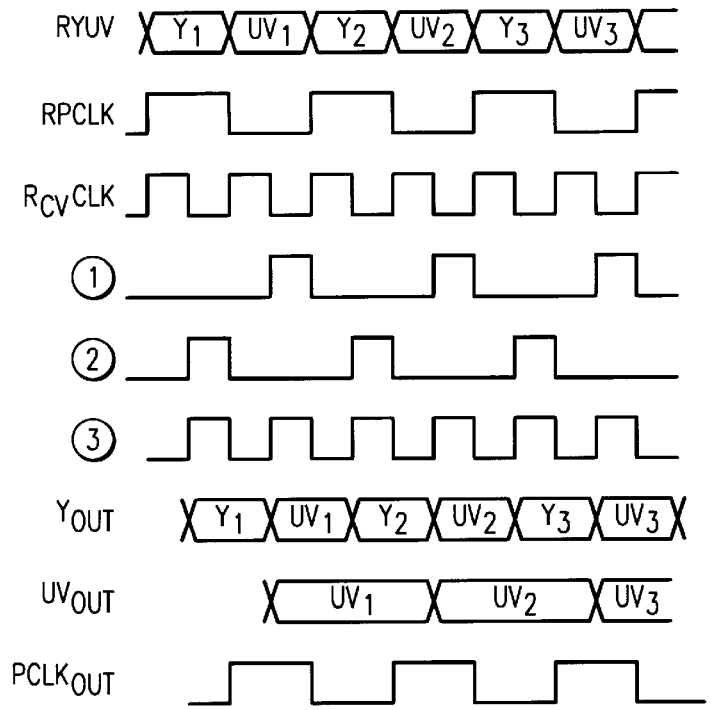
FIGS. 10a and 10b describe the operation of the circuit of FIG. 8b.
Figure 10B:
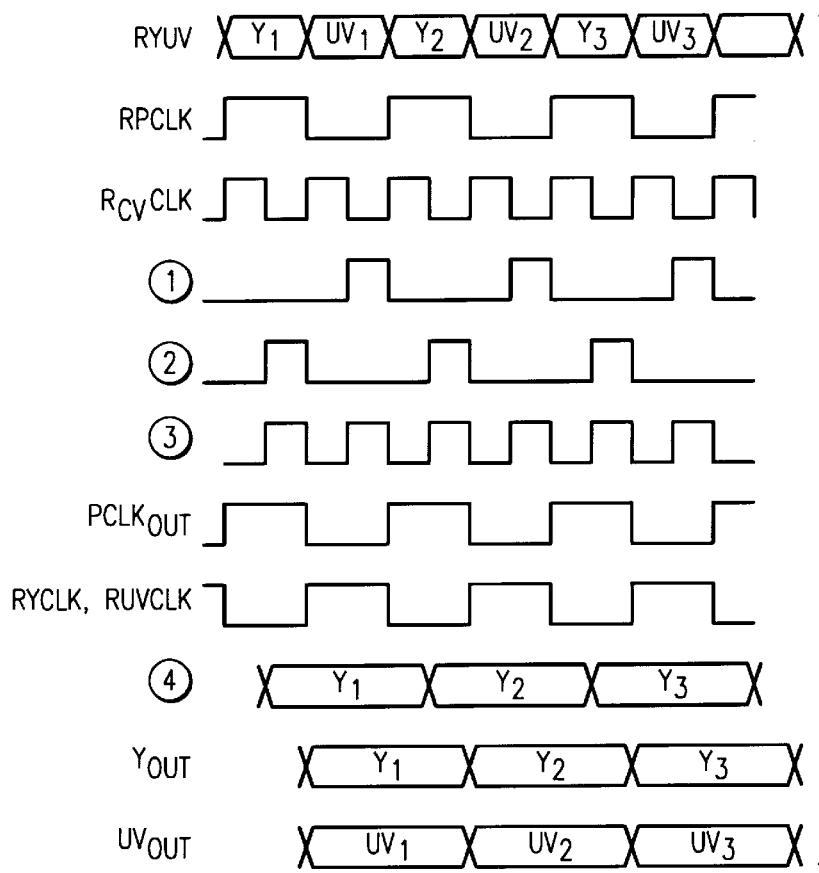

FIG. 10a illustrates clock signals related to the circuit of FIG. 8b when MODE=0 (i.e., 8-bit mode). FIG. 10b illustrates clock signals related to the circuit of FIG. 8b when MODE=1 (i.e., 16-bit mode).

The present invention provides significant advantages over the prior art. By clocking the data at the transmission end of the LVDS stream at a first edge (i.e., the rising edge) of the clock signal and by clock data at the receiving end of the LVDS stream at a second edge (i.e., the falling edge) of the clock signal, the original setup time requirement is preserved, without the need for custom LVDS converters.

Although the Detailed Description of the invention has been directed to certain exemplary embodiments, various modifications of these embodiments, as well as alternative embodiments, will be suggested to those skilled in the art. The invention encompasses any modifications or alternative embodiments that fall within the scope of the Claims.

What is claimed is:

1. A circuit for transmitting a digital information stream at known logic levels over a LVDS data stream, comprising:
   a clock signal synchronous with said digital information stream;
   an LVDS transmitter coupled to said clock signal and said digital information stream to convert said digital information stream to LVDS logic levels responsive to a first edge of said clock signal; and
   an LVDS receiver coupled to said LVDS transmitter for converting said LVDS logic levels of said digital information stream back to pre-conversion logic levels, said digital information stream being clocked at a second edge of said clock signal.

2. The circuit of claim 1 wherein said known logic levels are TTL/CMOS logic levels.

3. The circuit of claim 1 wherein said first edge is a rising edge and said second edge is a falling edge.

4. The circuit of claim 1 wherein said data stream comprises a video data stream.

5. The circuit of claim 1 and further comprising a display controller coupled to said LVDS receivers, said display controller clocking data output from said LVDS receiver at said first edge of said converted clock signal.

6. The circuit of claim 5 wherein said LVDS receiver is coupled to a video port of the display controller for transferring image data to a frame buffer.

7. A display circuit comprising:
   a clock signal synchronous with a digital information stream containing image information;
   an LVDS transmitter coupled to said clock signal and said digital information stream to convert said digital information stream to LVDS logic levels responsive to a first edge of said clock signal;
   an LVDS receiver coupled to said LVDS transmitter for converting said LVDS logic levels of said digital information stream back to pre-conversion logic levels, said digital information stream being clocked at a second edge of said clock signal; and
   a display controller for receiving data output from said LVDS receiver at said first edge of the said clock signal and passing said output to a frame buffer.

8. The circuit of claim 7 wherein said pre-conversion logic levels arc TTL/CMOS logic levels.

9. The circuit of claim 7 wherein said first edge is a rising edge and said second edge is a falling edge.

10. The circuit of claim 7 wherein said data stream comprises a video data stream.

11. A computer comprising:
    one or more ports for receiving a digital information stream containing image information;
    a clock circuit for generating a clock signal synchronous with a digital information stream;
    an LVDS transmitter coupled to said clock signal and said digital information stream to convert said digital information stream to LVDS logic levels responsive to a first active edge of said clock signal;
    an LVDS receiver coupled to said LVDS transmitter for converting said LVDS logic levels of said digital information stream back to pre-conversion logic levels, said digital information stream being clocked at a second edge of said clock signal; and
    a display controller for receiving data output from said LVDS receiver at said first edge of the said clock signal and passing said output to a frame buffer.

12. The computer of claim 11 and further comprising processing core logic coupled to said display controller.

13. The computer of claim 11 wherein said pre-conversion logic levels are TTL,/CMOS logic levels.

14. The computer of claim 11 wherein said first edge is a rising edge and said second edge is a falling edge.

15. The computer of claim 11 wherein said data stream comprises a video data stream.

16. The computer of claim 11 wherein said ports are PC Card slots.

17. A method of transmitting a digital information stream at known logic levels over a LVDS data stream, comprising the steps of:
    generating a clock signal synchronous with said digital information stream;
    converting said digital information stream to LVDS logic levels using a LVDS transmitter clocked to a first active edge of said clock signal;
    converting said digital information stream to pre-conversion logic levels using an LVDS receiver coupled to said LVDS transmitter, said digital information stream being clocked by said LVDS receiver at a second edge of said clock signal; and
    receiving said digital information stream from said LVDS receiver responsive to said first edge of said clock signal.

18. The method of claim 17 wherein said pre-conversion logic levels are TTL/CMOS logic levels.

19. The method of claim 17 wherein said first edge is a rising edge and said second edge is a falling edge.

20. The method of claim 17 wherein said data stream comprises a video data stream.

21. The method of claim 20 wherein said receiving step comprises the step of receiving said digital information stream from said LVDS receiver in a display controller responsive to said first edge of said clock signal.

* * * * *